Patented Sept. 29, 1942

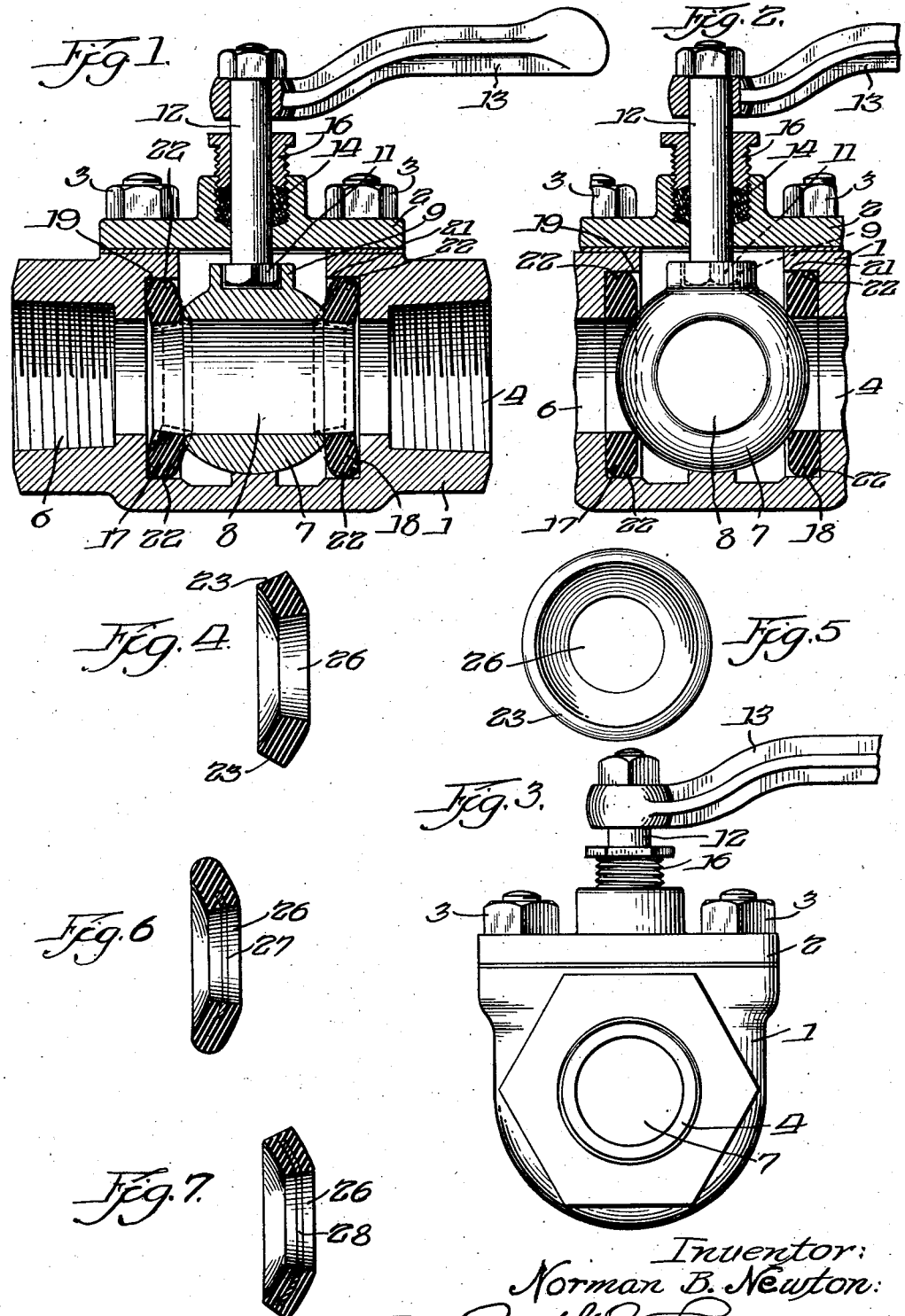

2,297,161

UNITED STATES PATENT OFFICE 2,297,161

SEAT RING FOR ROTARY VALVES

Norman B. Newton, Chicago, Ill., assignor to Crane Co., Chicago, Ill., a corporation of Illinois Application August 25, 1941, Serial No. 408,165

5 Claims. (Cl. 251—113)

This invention relates to a new and improved form of seat ring for rotary valves in which the latter employ a spheroidal type of closure member. It has for one of its principal objects the provision of a concavo-convex ring of flexible, elastic material, the mounting thereof within the casing providing that the seat ring is substantially flattened upon assembly with the closure member thus providing a greater bearing load at its outer periphery.

An important object of this invention is to provide novel valve seats having relatively small areas of contact or bearing surfaces with the closure member with the result that large bearing loads are applied to relatively small areas and thus tend to improve the valve seat tightness.

Another important object of this invention is the provision that with a substantial portion of the bearing load on the outside periphery of the seat rings it is possible for the inlet seat to be pressure tight especially under relatively low pressures.

A still further important object of this invention is to provide rubber or composition seat rings capable of a flexibility that permits greater tolerances in machining of the body and disc without impairing valve seat tightness.

Other and further important objects of this invention will become apparent from the disclosures in the following specification read with the accompanying drawing, in which Fig. 1 is a vertical sectional view of a valve employing the principles of my invention.

Fig. 2 is a view similar to Fig. 1 with the spherical closure member rotated through an arc of 90 degrees.

Fig. 3 shows an exterior end view of the valve employing my invention.

Fig. 4 is a modified form of rubber seat ring used in my invention.

Fig. 5 is a front plan view of the rubber ring shown in Fig. 4.

Fig. 6 is a further modified form of the seat ring.

Fig. 7 is still another form of the novel seat ring.

As shown in the drawing, the reference numeral 1 indicates generally the body or casing portion of a valve, having a bonnet 2 bolted to the body 1 by means of the bolts 3. The body 1 has the usual inlet 4 and the outlet 6. The valve of this invention comprises a spherical form of disc or plug closure member 7, the latter having an aperture 8 therethrough adapted to connect the inlet 4 with the outlet 6. The spherical disc 7, at its upper portion, is provided with a polygonally shaped socket 9 into which sets the similarly shaped but substantially smaller polygonal stem end 11 of the stem proper 12, the latter being rotatable and operated by the hand lever 13. The stem 12 extends through the bonnet 2, and to prevent leakage therearound is provided with the customary packing 14 and the packing nut 16.

The seat rings of this invention composed of rubber or other suitable material shown at 17 and 18 are preferably molded in the concavo-convex shape as shown by the dotted lines in the assembly, Fig. 1, or as shown more clearly in the modifications illustrated in Figs. 4, 6 and 7. Obviously, the seat rings 17 and 18 can be made of rubber, synthetic rubber or any other material having similar flexible elastic characteristics. The body 1 is provided with annular recesses, as shown at 19 and 21, for the reception of the seat rings 17 and 18. The ends of the seat rings 17 and 18 may be rounded as shown at 22. In actual practice, the closure member 7 need not be a perfect sphere inasmuch as the diameter through the aperture 8 is less than the diameter perpendicular to the aperture 8 as it is shown in Fig. 2. Before installation of the spherical plug 7 the rubber seat rings 17 and 18 extend into the space to be occupied by the closure member 7 as shown by the dotted lines in Fig. 1. The disc 7 is assembled with the casing 1 by being inserted from the top and before the bonnet has been placed in position and when the aperture 8 through the sphere is in the position shown in Fig. 1. The spherical form of the closure member is thus capable of spreading the rubber seat rings toward a flattened position within the body. The latter flattening produces an increased diameter in the rings, making a fluid-tight seal at the outer periphery of the rings between the curved or rounded ends 22 and the annular recesses or shoulders 19 and 21. Inasmuch as the rubber seat rings are molded in the concavo-convex form, as shown by the dotted lines, they will always tend to resume that original shape. Therefore, the tendency of the rubber seat rings is to assume the shape as shown by the dotted lines and in so doing make a fluid-tight seal with the closure member 7. The polygonal socket connection between the stem and the closure member, as shown at 9 and 11, is relatively loose thus allowing the spherical closure member 7 to have lateral motion as originated by line pressures. When the spherical disc 7 is rotated by the handle 13 to a position shown in Fig. 2 wherein the largest diameter of the sphere is spreading the seat rings 17 and 18, they become or assume an almost flat, washer-like shape. The sealing of the valve by a rotation of the sphere increases the load on the rubber seat rings thus further insuring a fluid-tight valve.

Figs. 4, 5, 6 and 7 show modified forms of rubber seat rings all of which are adaptable to the valve assembly shown in Fig. 1. The modified seat rings as shown in Figs. 4, 6 and 7 are molded in a similarly concavo-convex shape as shown by the seat rings 17 and 18 of Figs. 1 and 2. Fig. 4 shows a rubber seat ring differing from the seat ring 17 in that the outer periphery is not rounded but flat as shown at 23. Fig. 5 is a plan view of the ring shown in Fig. 4 having an aperture 26 and the flat annular periphery 23. The rings shown in Figs. 6 and 7 are modifications having reinforcing metallic springs 27 and 28, respectively. The metallic spring 27 is very small and does not extend over the entire length of the rubber seat ring as does the spring 28. The inserted spring washers 27 and 28 can be of any desired curvature and strength and will aid in the tendency of the rubber to assume its original molded shape.

In valves of this type it is generally believed that only the outlet should be pressure tight and not both the inlet and outlet. However, in this novel construction the spring tendencies of the seat ring constantly seal both inlet and outlet regardless of the line pressure which tends to move the disc 7 laterally against the outlet seat ring and thereby seal it tighter at the latter location than at the inlet 3; but in no instance is the inlet seat ring entirely disengaged from either the closure member 7 or the outer shoulder in the body itself. Therefore the tendencies of this valve will be to eliminate any line fluid from circulating around the peripheral surfaces of the sphere or closure member 7. This provision, however, is not important to the operation as packing is employed in the bonnet to prevent any leakage therethrough if the inlet side of the valve should allow leakage of line fluid.

Because of the unique construction employed, much greater tolerances are permissible in the machining of the body of this valve and also of the spherical disc 7 than in any previous valves of this type employing flat seat rings. The flexible elastic qualities of the seat rings make it possible to have a fluid-tight valve without the expensive machining operations ordinarily accompanying the manufacture of such a valve. My novel seat arrangement makes the valve relatively cheap to manufacture; it is always fluid tight, has seats that are readily renewable and effects complete opening of the valve within a quarter turn of the handle.

It is obvious that numerous changes can be made without varying from the principles described in this specification and I therefore do not propose limiting the patent granted hereon otherwise than as necessitated by the prior art.

I claim:

1. A plug type valve comprising a body having an inlet and an outlet, flexible elastic seat rings mounted in the said body, the said flexible elastic seat rings having a normal contour projecting inwardly at their central portions toward each other, a spheroid formed closure member having an aperture therethrough, the said closure member being mounted between the said flexible elastic seat rings, whereby the inwardly extending contour of the said seat rings is changed to a substantially flat contour.

2. A valve comprising a housing having an inlet and an outlet, the housing having annular recesses associated with the said inlet and outlet, flexible seat rings positioned within each of said recesses, the said seat rings being convexly formed with respect to the center of the valve, a spheroid plug closure member having an opening therethrough positioned centrally of the two seat rings and spreading each of the said seat rings into an abnormal flat position, the said seat rings forming a resilient seal with the plug closure member and with the recesses in the said housing at the outer peripheries of the said seat rings.

3. A valve comprising a casing having an inlet and an outlet, internal annular recesses in the said casing associated with the said inlet and the said outlet, flexible seat rings adapted to fit within the said annular recesses, the said seat rings being initially reinforced and molded into a concavo-convex shape and placed in the recesses so that their apertured convex portions oppose each other to restrict the size of the opening between the inlet and the outlet, a spheroidal closure member having an aperture therethrough placed between the inwardly extending face portions of the seat rings and tending upon assembly with said casing to flatten the said seat rings against the said recesses, the outer peripheries of the said seat rings being rounded to contact with the bottom and peripheral portions of the said recesses.

4. A valve comprising a casing having an inlet and an outlet, annular recesses in the said casing associated with the said inlet and the said outlet, flexible dished seat rings adapted to fit within the said annular recesses and positioned in the recesses so that their projecting portions face each other to restrict the opening between the inlet and the outlet, a spheroidal type closure member having an aperture therethrough and assembled within the casing to flatten the said seat rings in a washer-like form, the outer peripheries of the said seat rings being relatively flat to fit the corner portions of the said recesses.

5. A valve comprising a casing having an inlet and an outlet, annular recesses internally of the said casing associated with the said inlet and outlet, rubber seat rings adapted to fit within the said annular recesses, the said rubber seat rings molded in a concavo-convex shape, the said rings placed in the recesses so that their enlarged central portions face each other restricting the size of the opening between the inlet and the outlet to a minimum, a plug type closure member having an aperture therethrough and placed between the inwardly facing seat rings tending to flatten the seat rings against the bottom faces of the said recesses, a reinforcing metallic element within said body seat rings whereby the said element acts to continually force the seat ring to assume its original concavo-convex shape.

NORMAN B. NEWTON.